US007651086B2

(12) United States Patent
Werner

(10) Patent No.: US 7,651,086 B2
(45) Date of Patent: Jan. 26, 2010

(54) PAGE SEPARATORS TO AID PAGE TURNING

(75) Inventor: Frank Werner, Teton Village, WY (US)

(73) Assignee: Origin, Inc., Jackson, WY (US)

( * ) Notice: Subject to any disclaimer, the term of this patent is extended or adjusted under 35 U.S.C. 154(b) by 161 days.

(21) Appl. No.: 11/977,469

(22) Filed: Oct. 25, 2007

(65) Prior Publication Data

US 2009/0127769 A1 May 21, 2009

Related U.S. Application Data

(60) Provisional application No. 60/874,358, filed on Dec. 12, 2006.

(51) Int. Cl.

*B65H 1/00* (2006.01)
*B32B 3/02* (2006.01)
*B32B 5/00* (2006.01)
*B31F 1/12* (2006.01)

(52) U.S. Cl. .......................... 271/145; 428/81; 428/84; 428/98; 428/153; 428/157; 428/192

(58) Field of Classification Search .............. 428/32.18, 428/32.2, 81, 84, 98, 119, 120, 141, 152, 428/153, 156, 157, 161, 174, 177, 192; 271/145
See application file for complete search history.

(56) References Cited

U.S. PATENT DOCUMENTS

| | | | | |
|---|---|---|---|---|
| 5,735,544 | A | 4/1998 | Buckner | 281/45 |
| 5,772,268 | A | 6/1998 | Chabrier | 294/1.1 |
| 7,037,017 | B2 | 5/2006 | Buck et al. | 401/195 |
| 2001/0042956 | A1* | 11/2001 | Minoru et al. | 271/265.04 |
| 2003/0215612 | A1* | 11/2003 | Richards, Jr. | 428/174 |
| 2007/0020960 | A1* | 1/2007 | Williams | 439/66 |

* cited by examiner

*Primary Examiner*—David H Bollinger
(74) *Attorney, Agent, or Firm*—Westman, Champlin & Kelly, P.A.

(57) ABSTRACT

The present sheet separation technique provides easy means to separate thin sheets of paper. Slight bulges of various forms that do not nest together with adjacent sheets are formed in the sheets so that each sheet stands slightly free from its neighbors at or near such bulges so long as a sheet is not weighted down significantly. When weighted significantly, such as by numerous overlying pages, the sheet becomes flat as in the usual present form not having such features. In a preferred form, parts of at least some of the bulges extend to, or near, one or more edge locations.

17 Claims, 4 Drawing Sheets

PAGE SEPARATORS TO AID PAGE TURNING

This application claims priority under 35 U.S.C. 119(e) based on U.S. provisional patent application Ser. No. 60/874,358, filed Dec. 12, 2006, the content of which is incorporated by reference.

BACKGROUND OF THE INVENTION

With sheets ("pages") of a book, magazine, newspaper, or other group of flexible, thin sheets, it is often somewhat inconvenient to turn a single page. A common result is turning 2 or more pages. This is particularly the case with thin, coated paper, especially when the user's fingers are dry and smooth. It is common practice to touch a finger to one's tongue to provide more friction to the page. This is reasonably convenient, but is not hygienic. An especially significant case, for example, is a doctor's waiting room where people with diseases may have used the same reading material. The present invention provides a convenient means for easily turning a single page with no need for auxiliary means to facilitate the process.

PRIOR ART

A common aid for turning pages is a rubber "finger guard" that slips over a finger tip to provide good friction to a page that is to be turned. While effective, the finger guard must always be at hand and put in place for use.

U.S. Pat. No. 7,037,017 (Buck) and U.S. Pat. No. 5,735,544 (Buckner) provide rubber parts for the end of a pen or pencil that may be used to provide rubber-to-sheet friction that minimizes the problem. This also requires having the device at hand, and properly manipulating it.

U.S. Pat. No. 5,772,268 (Chabrier) describes a vacuum cup device using reusable adhesive to separate sheets. It is also quite different from the present invention.

Forms of variation of shapes of sheet edges also have been used to ease the task of page turning, but do not disclose the non-nesting features defined here.

SUMMARY OF THE INVENTION

The present disclosure provides slight bulges of various forms so that each sheet or page stands slightly free from its neighbors so long as it is not weighted down significantly. That is, the bulges of adjacent pages are not allowed to nest. The bulges are formed to retain their shape. When weighted significantly, such as by numerous overlying pages, the formed page bulge disclosed become flat, as in the usual present form not having such features. However, the bulges are permanent and sufficiently resilient so that they will bulge out or up again when the weight of overlying pages is reduced and only a few pages are overlying the bulge.

DETAILED DESCRIPTION OF THE DISCLOSURE

The present disclosure teaches use of slight bulges in sheets or pages arranged such that adjacent sheets are slightly separated by such bulges and cannot nest into a sometimes inconvenient close engagement that is difficult to separate, similar to the manner in which flat sheets can lie in close proximity to each other. The bulges can take any of many forms, several of which are described in the following.

In general, when a sheet of paper is bent over a mandrel or other forming fixture so that there is a minimum radius of curvature, the result may vary substantially when the bending stress is removed—that is, when the bending process is completed, meaning the mandrel or other forming fixture is removed. If the mandrel has a radius of zero, it corresponds to a sharp crease in the paper. When the bending process is completed, the paper will not be flat. When the radius is larger, the paper will retain a radius of curvature that is larger than that of the mandrel. As still larger radii, the paper will retain no radius and will become flat again when the bending process is completed. Accordingly, choice of the mandrel radius governs the shape of the paper after removal of the mandrel or fixture. For the present purposes, concern is primarily in the region of rather large radii such that only large radii will remain in the paper after the bending process. It is important for the radius during the bending process not to be somewhat larger, where no radius remains in the paper (that is, the paper remains flat after completion of the bending process.)

While this describes long, part-cylindrical bends it approximately describes shorter part-cylindrical bends, which might be described as bulges.

Figure 1:
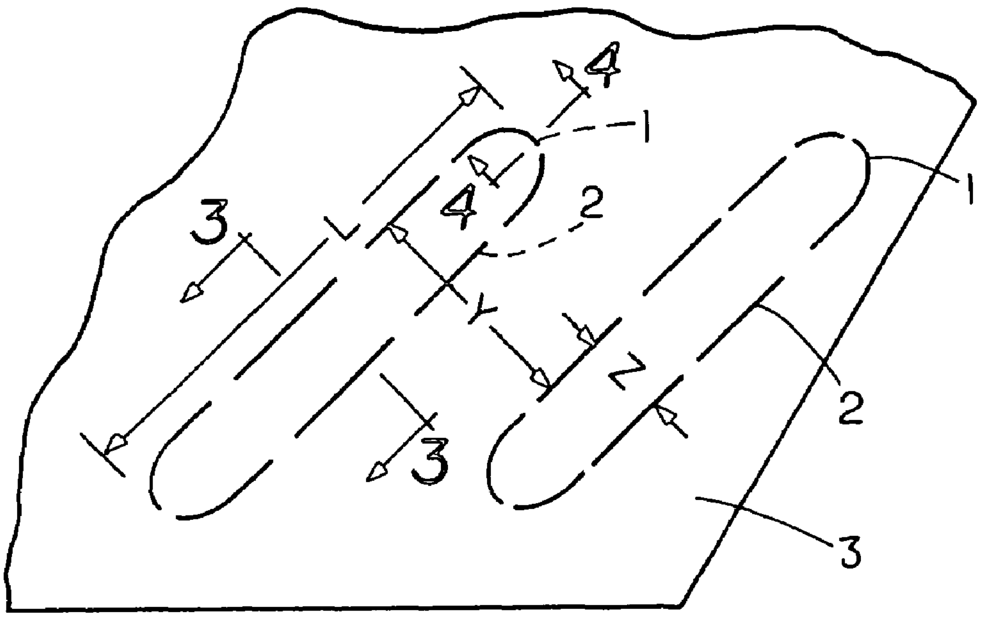
FIG. 1 shows a sheet having oblong bulges where the outline is indicated by dashed lines.

It should be noted that for a given bulge or part-cylinder, as shown in FIG. 1, this description refers to the portion having the smallest radius of curvature. Portions of the paper adjacent this curvature may have other, larger radii that are of much less concern.

The net result of the preferred bulge (bending as described above) of the paper is that it is easily flattened by the weight of overlying sheets, but has sufficient resiliency to at least partly return to the bulge shape when all or most of the weight of overlying sheets is removed.

Suitable processes to make such bulges are known, such as embossing. The appropriate positioning and shape of bulges for providing page separation is disclosed herein.

Many magazines are typically printed on very thin, flexible, sheets that are often particularly smooth, often with coated surfaces, and often are cut with very even, straight edges. These pages tend to require particular care to turn one sheet at a time. The methods of sheet separation described herein are particularly useful in such cases.

Figure 2:
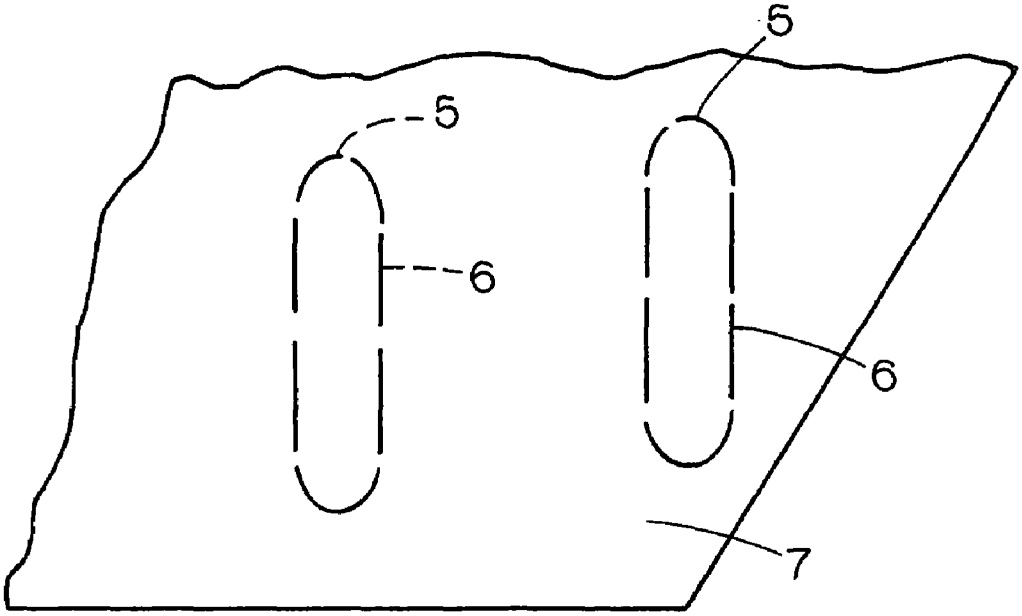
FIG. 2 is similar to FIG. 1 but shows bulges in alternate locations so as not to nest when a sheet such as FIG. 1 is overlain.

FIG. 1 shows a sheet (or page) of paper or other material at numeral 3 that has bulges indicated by dashed lines 1 and 2 that may be located in any of various ways, with bulges on each sheet positioned differently between adjacent sheets. Similar bulges are shown in FIG. 2 where an adjacent (underlying or overlying) page 7 has different orientations of such bulges shown at 5 and 6 in the dashed lines. The bulges may be of different sizes or shapes. Alternate sheets may even be flat with every other sheet having bulges. The length L of the bulges (FIG. 1) may be large, even to the extent of being in the shape of partial cylinders and may extend from one edge of the sheet to another edge. Alternately, the length L could be small, even to the extent of the tops of the bulges being spherical in shape. The axes of the bulges need not be straight as shown in the illustrated bulges. Preferably a bulge or bulges are at least partially adjacent an edge of the sheet. The bulges have a width shown at Z, and can be spaced by a distance Y, which is "on center" distance between the bulges, and should be about two or more times the width "Z". As shown, the spacing is about two and a half times "Z".

Figure 3:
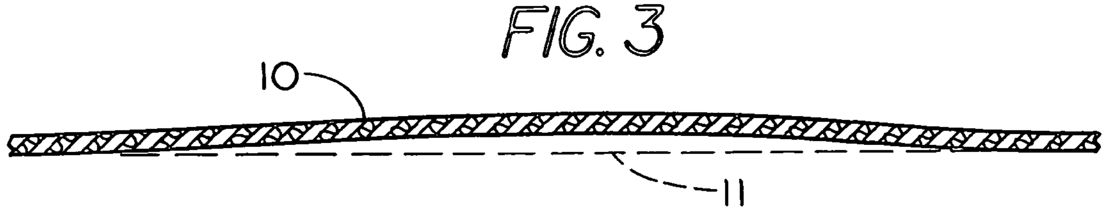
FIG. 3 is a greatly enlarged cross sectional view as indicated at 3-3 in FIG. 1.
Figure 4:
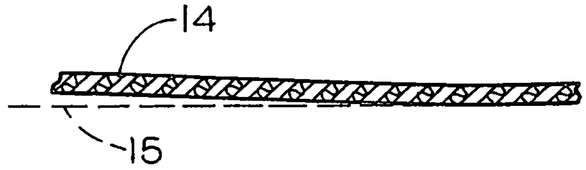
FIG. 4 is like FIG. 3, but with the view indicated at 4-4 in FIG. 1.

FIG. 3 shows how such bulges may appear when viewed along line 3-3 in FIG. 1 and FIG. 4 shows a similar view such as along line 4-4 in FIG. 1. The bulged sheets shown are at 10 in FIG. 3 and at 14 in FIG. 4. The flat condition of the sheets is indicated at the dashed lines 11 and 15 respectively. Both FIGS. 3 and 4 are greatly enlarged to illustrate the use of a large radii of curvature and small bulge depth for the present purpose.

The radii of curvature of the bulges are in no case small enough so that when sheets with bulges are horizontal or inclined from horizontal less than 45 degrees, such sheets will not lie flat when a stack of sheets of modest depth (4 sheets or more) overlays the curved sheets. The bulges will collapse so the sheets flatten when modestly loaded. The bulges re-form when the top sheets loading the bulges are removed. The reforming is due to permanent deformation of the paper during bulge forming, and natural resilience of paper.

It is seen that such arrangement or orientation of bulges prevents the bulges of two adjacent sheets from nesting and provides a small separation of sheets when there is little or no loading to compress the sheets flat.

The indicated small separation of sheets facilitates turning one sheet at a time with far less likelihood of turning more than one page when turning only one page is what is desired. It also indicates how a small stack of sheets may have sufficient weight to flatten such bulges, such that the thickness of a closed stack, such as a book, may have little or no significant increase in overall thickness. The bulges may be only at selected edges of pages or there may be a plurality of bulges that are located on any or call locations.

A different method is to cut at least one corner at a marked angle relative to the plane of the sheets rather than the usual straight (perpendicular) cut. This is comparable to some large dictionaries where 26 part-cylindrical cuts are made through a number of sheets to expose each letter of the alphabet of the first sheet of that dictionary section. This method allows slight staggering of the edges of successive sheets, but would be less practical except for a thin stack, since a new angle cut would be desirable every fraction of an inch of thickness. Such cuts also may remove page numbers or other printing near the cut corners. It would be difficult to apply for newspapers.

The preferred bulges may be compared with well-known embossing of sheets. There are essential differences. In no case, do the present bulges have bends of small radii of curvature; bulges are specifically arranged to prevent nesting; and maximum depth of the present bulges may be much smaller, so that a casual view does not prominently show the deformations.

Figure 5:
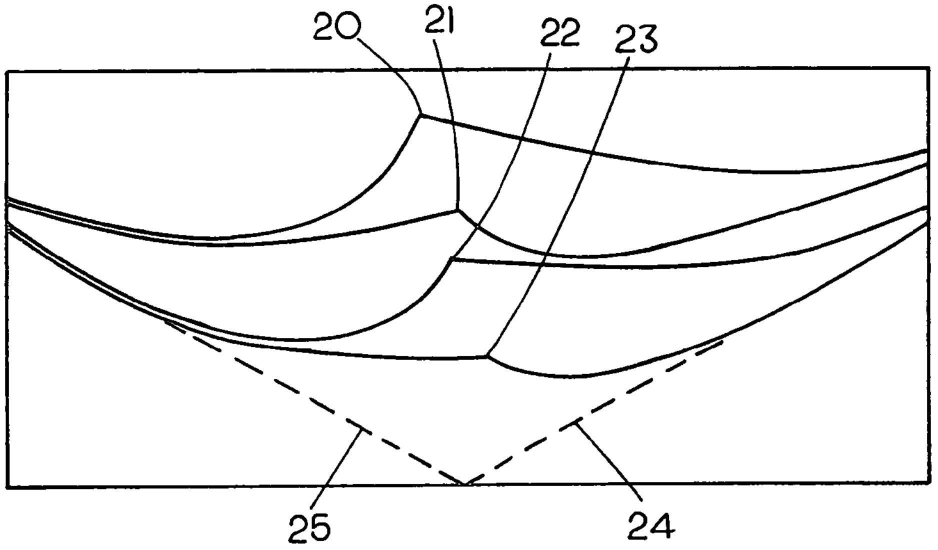
FIG. 5 is a greatly enlarged schematic perspective view of the corner of a stack of sheets having alternate bulges along axes defined in FIG. 6.
Figure 6:
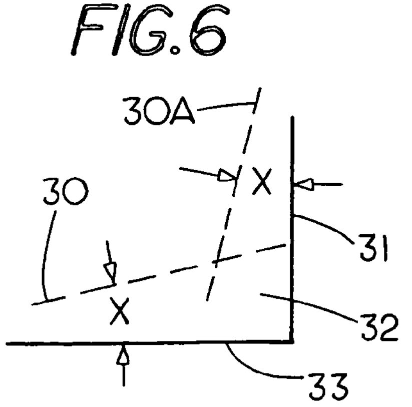
FIG. 6 shows, by dashed lines 30 and 30A, the axes of the cylindrical curvature of sheets shown in FIG. 5.

An alternate arrangement and location of such bulges may be used. FIG. 5 shows a greatly enlarged corner, such as the upper right corner of a stack of sheets. The stack of sheets could be pages of a book or magazine. This view shows only 4 sheets, for purposes of illustrating the fundamental features of the present method. The dashed lines 24 and 25 show the flat position of the sheets. Numerals 20, 21, 22, and 23 show how the location of otherwise similar bulges on alternate sheets differ. In this case, part-cylindrically curved sheets form the bulges. FIG. 6 shows how the axes of the curve of alternate sheets differ. The dashed line 30 represents the axis of a part-cylindrical deformation of one sheet and line 30A represents the axis of a part-cylindrical deformation of an adjacent sheet. Thus the essential difference in the bulges of deformation between the adjacent sheets is that the axes of the part-cylindrical bends are substantially different between adjacent sheets.

Another alternate embodiment is for alternate sheets to be flat with no bulges. It is seen that this will provide separation of sheets for easy turning of only one sheet at a time, since the bulges of the next sheet will lift the flat sheet. This applies to all configurations herein discussed.

For illustration, the sheets of paper were bent or formed to part-cylindrical shape by finger pressure on a mandrel 0.35 inch diameter, and when released, had a radius of curvature of about 0.8 inch. The angles X shown in FIG. 6 were about 15 degrees. The edges of the sheets are shown at 31 and 33. In FIG. 5, it can be seen that the upper sheets have somewhat smaller radii of curvature than the lower sheets because of more weighting on the lower sheets. When the sheets are stacked in a position so that the plane of the stack is inclined moderately far from vertical, (that is 45° or more) if there had been dozens of sheets or more, the lower sheets would have become flat due to the weight of the overlying sheets. The sheets returned to their bent or formed curved shape when the weight of overlying sheets was removed.

Figure 8:
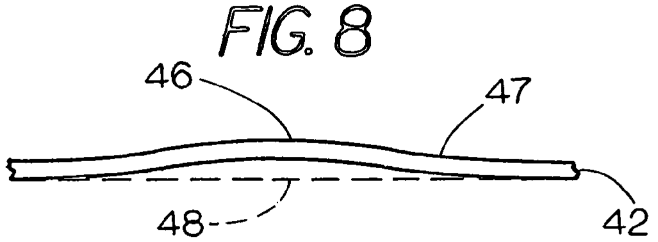
FIG. 8 is a page with thickness greatly enlarged in the view indicated at 8-8 in FIG. 7.

It is important to note that for illustration, FIG. 5 has much smaller radii of curvature than normal cases would use. FIGS. 3, 4 and 8 are more representative of preferred radii, showing much larger radii of curvature.

Newspapers usually present a special problem. They are typically cut with a saw-tooth shape on one edge, with many sheets being cut at one operation. The result is a tendency for such saw-tooth edges to mechanically interlock slightly, increasing the difficulty of separating sheets. Importantly, such pages or sheets usually have an adjacent edge (at 90°) that is cut square and cleanly with no tendency for mechanically interlocking.

Figure 7:
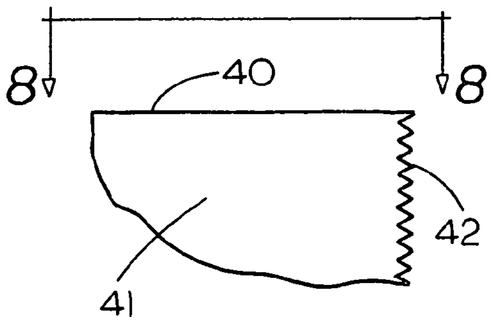
FIG. 7 is a view of the corner of a typical newspaper having one smooth edge 40 and one saw-toothed edge 42.

FIG. 7 shows the typical newspaper case with the saw-tooth edge at 42 and the smooth edge at 40. Bulges of any one or more of various shapes can extend to, or near, edge 40 to cause separation of sheets along that edge. FIG. 8 shows a view taken along line 8-8 in FIG. 7, indicating one form of bulge at 46 and 47, with a flat sheet indicated at the dashed line 48. Again, an alternate is to put such bulges only on alternate sheets, with intervening sheets being nominally flat.

To form the bulges, there are many processes or machines that would be suitable. The embossing process illustrates many of them and could be used with appropriately large minimum radii after the embossing treatment. In a simple form, pressing the sheet against a mandrel with finger pressure is effective, but not suitable for production. Pressing foam material against such a mandrel serves well. There are thin, volatile liquids that can leave a thin layer of a solute on one side of a sheet of paper as the liquid dries. This thin layer of a solute can be chosen from a material that shrinks when dry to cause curing in the manner required. Suitable liquids such as ethyl alcohol with any of various dissolved resins, can be used and are easily applied to paper. Such treatment could be used in chosen spots on the sheet to provide suitable permanent curvature forming bulges that flatten when weighted, but resiliently return to the curved shape when unweighted sufficiently.

Tests were made to indicate the approximate results of bulge forming. They provide a rough guide for the suitable radii. They are described below.

Various kinds of paper will need different radii of curvature, depending on temperature and relative humidity to which the paper has been exposed at the time of forming such radii.

Embossing to form the bulges could be done at a paper mill. In this case, bulges could be provided for the entire area of a large sheet or roll. A printer or other processor using such large sheets could take care to cut them for the final product size so as to avoid nesting. Embossing might also be done at a book printer, newspaper printer, or magazine printer as a part of the printing operation.

Figure 10:
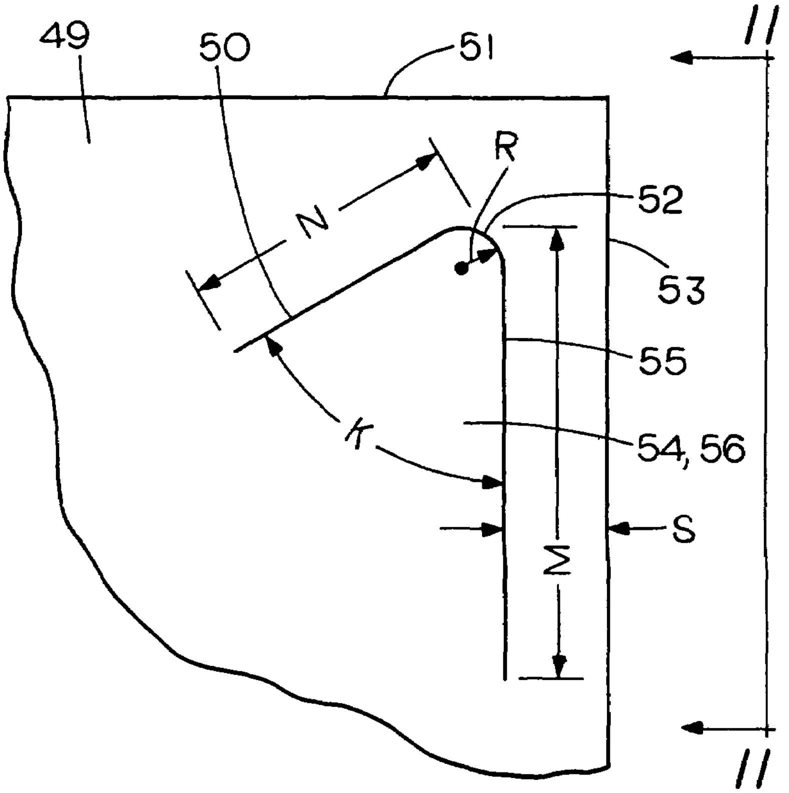
FIG. 10 is a fragmentary corner of a sheet using a modified form of bulge for ease of page turning.
Figure 11:
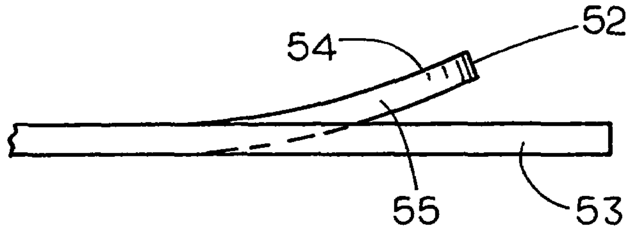
FIG. 11 is a view taken on line 11-11 in FIG. 10 showing a first type of bulge formed in the shape shown in FIG. 10.
Figure 12:
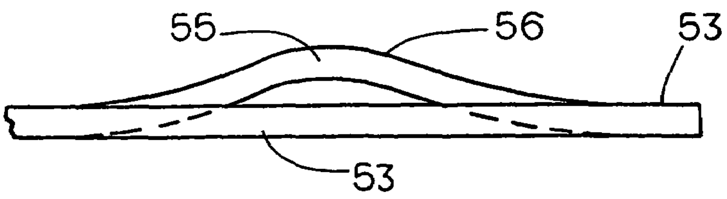
FIG. 12 is a view also taken on line 11-11 in FIG. 10 showing a second type of bulge formed from a cut line shown in FIG. 10.

Variation for the bulges such as those of FIGS. 5 and 6 are shown in FIGS. 10, 11 and 12. The edges of a sheet 49 are shown at 51 and 53. A cut line 50 extends for a distance N, and for the form of bulge shown in FIG. 11, the cut extends along a radius R along cut line 52 and then for a length M along cut line 55. At least a portion of the bulge of FIG. 10 is defined by a cut through the sheet. Preferably, cuts should remove a narrow strip from the sheet. The reason is that when a sheet is cut and flattened, it may not freely open as desired at the cut line because of the friction in the cut. Removing a narrow strip prevents this.

The bulge portion 54 shown in FIG. 11 is formed up so the radiused end at cut line 52 is raised up from the sheet surface. This can be formed as a partial cylinder.

FIG. 12 shows a bulge 56 formed with only cut 55, and with lines 50 and 52 uncut. There is only a single cut line along one side of the bulge 56. The cut lines at 50 and 55 need not be straight lines as illustrated in FIG. 10

In FIG. 10, the dimension S shows the distance from the edge of the sheet to the cut line 55. Dimension S may be zero or larger. When it is zero, the bulge formed would be like that of FIG. 5.

As with the other forms of bulges, the cut line angles and/or bulges can be changed for adjacent sheets, to prevent nesting. Also a flat sheet may be interspersed with sheets having bulges and there would be no need to have alternating directions for the cut lines at the edges of the formed bulges.

Following are preliminary test results of pressing a sheet of paper partly around cylinders (mandrels). The paper was pressed down by finger pressure on samples using three different diameters of cylindrical mandrels on 1" by 1" paper samples. Rubber or urethane foam works well for pressing the paper against the mandrel instead of finger pressure. One purpose of the tests was to find the residual radius of curvature for various mandrel diameters. Another purpose of the tests was to find the number of sheets lying freely on the part-cylindrical bulge (or the grams per square inch) that would collapse the bulges and render the paper flat, as a function of mandrel diameter and type of paper. Results vary with temperature and humidity, so rough tests were made, all formed at 75° F. with relative humidity (rh) of 20%, as formed; after time at 100° F. at about 9% (rh); and after time at 100° F. with 100% rh. Results are in Table 1 and are graphed in FIG. 9. The tests were illustrative only.

TABLE 1

In left column of this table, paper #1 is 20 lb. office paper, 0.0038" thick; paper #2 is book paper, 0.0046" thick; paper #3 is newsprint, 0.0033" thick. The next column is the radius in inches of the mandrel for the initial bend. Each group of columns having 4 numbers represents the values identified in the central heading. The "stack thk" column is thickness, inches, of 20 lb office paper to flatten the paper after the 3rd group (after exposure at 100° F., at 9% rh, for 3.5 hours) and may be converted to grams per sq in, using paper thickness (.0038") and its weight per square inch (.0478 grams). All specimens and the stack were 1 inch square. Temperature and relative humidity (rh) alter results. The mandrel radii, above which there is no permanent bend are #1, 0.38"; #2, 0.38"; and #3, 0.22".

| paper # | radius, in. | paper radius, inches/temp, ° F./% rh/time, hr | | | | stack thk, inches |
|---|---|---|---|---|---|---|
| #1 | .05 | .15/75/20/.1 | .25/75/20/3.5 | .25/100/9/3.5 | .60/100/100/3.5 | 3.22 |
| #1 | .075 | .30/75/20/.1 | .30/75/20/3.5 | .44/100/9/3.5 | .70/100/100/3.5 | 1.67 |
| #1 | .10 | .40/75/20/.1 | .40/75/20/3.5 | .80/100/9/3.5 | .60/100/100/3.5 | 1.23 |
| #2 | .05 | .14/75/20/.1 | .14/75/20/3.5 | .16/100/9/3.5 | —/100/100/3.5 | 2.82 |
| #2 | .075 | .20/75/20/.1 | .20/75/20/3.5 | .25/100/9/3.5 | .60/100/100/3.5 | 2.42 |
| #2 | .10 | .25/75/20/.1 | .50/75/20/3.5 | .80/100/9/3.5 | .50/100/100/3.5 | 1.23 |
| #3 | .05 | .15.75/20/.1 | .15/75/20/3.5 | .35/100/9/3.5 | irregular shape | .67 |
| #3 | .075 | .25/75/20/.1 | .30/75/20/3.5 | .80/100/9/3.5 | irregular shape | .43 |
| #3 | .10 | /75/20/.1 | /75/20/3.5 | /100/9/3.5 | irregular shape | 0 |

Extended time at the mandrel radius has only a small effect on the bulge curvature retained, under modest storage conditions. Curvature was made on newsprint similar to the newspaper tested above with radius about 0.3 inches. These embossed samples were clamped flat and at room temperature for seven years. The humidity was generally rather low. The clamping caused little change of the curvature during that seven year time period. It appears that the first few hours or less of storage time closely approximate long-term effects on curvature retention.

From these tests, it is concluded that after forming, modestly elevated temperature (75° to 100° F.) does not alter the embossing to a serious extent, if the humidity is low (20% or 9%), but high humidity is somewhat detrimental on some kinds of paper, and very detrimental for newsprint (irregular shape).

Figure 9:
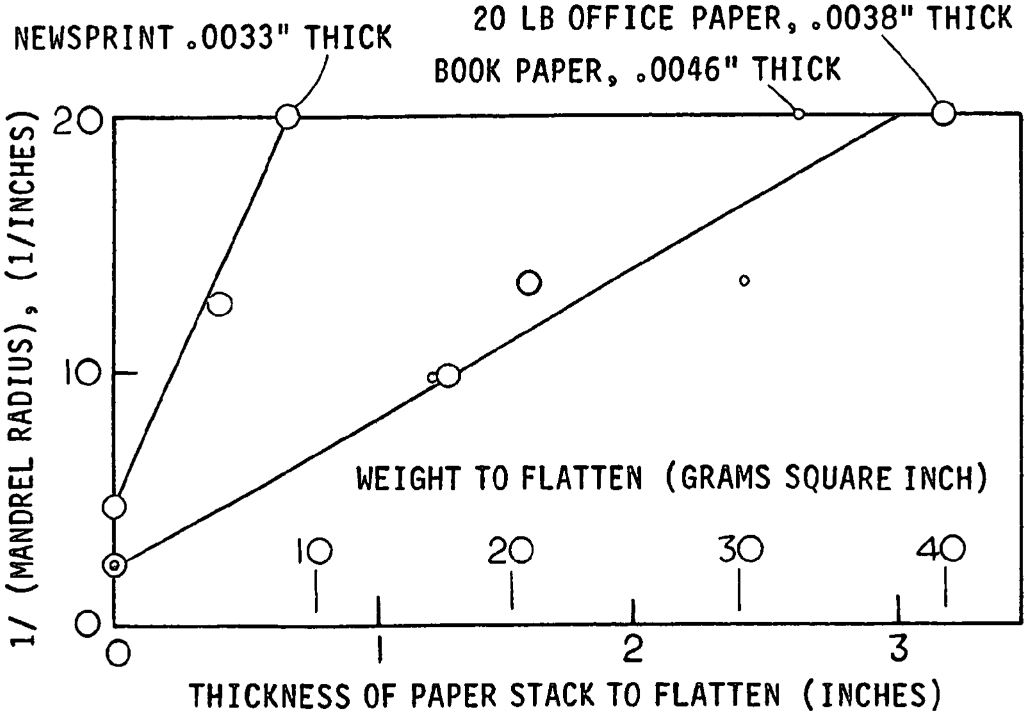
FIG. 9 is a graph that illustrates a significant result of Table 1.

FIG. 9 is a graph of typical results of Table 1 as shown with the sample held at 100 degrees Fahrenheit and 9% rh for 3.5 hours after forming. The straight lines assume linearity between the stack thickness and the reciprocal of the mandrel's radius. Office paper and paper from the book aren't the same thickness but graph about the same. At some large mandrel radius there is no residual curvature in the paper samples and the inverse of this radius plots at 0 on the paper stack scale. This illustrates tests necessary for choosing the radius desired, depending on the kind of paper, of which only 3 samples are illustrated.

For specific applications, these results can be used to as a rough guide determine the desired radii for the particular paper type. Actual variations in paper and environmental conditions require testing for each case.

The bulges resume their bulged shape when the weight of overlying pages is removed or clamping is removed.

Further, the page separating bulges are preferably positioned adjacent a corner that is easily accessible when reading a book or the like. Having the bulges adjacent an upper, right hand corner is most preferred, when the text on the page is oriented for reading.

Although the present invention has been described with reference to preferred embodiments, workers skilled in the art will recognize that changes may be made in form and detail without departing from the spirit and scope of the invention.

What is claimed is:

1. A method of separating adjacent sheets in a stack of a plurality of sheets, comprising providing bulges in at least alternate sheets in the stack, so the bulges provide separation of adjacent sheets, forming the bulges to flatten when at least 4 sheets are above a sheet having the bulge, and when sheets in the stack are inclined from horizontal by less than 45 degrees.

2. The method of claim 1 including providing bulges in all of the sheets in the stack and orienting the bulges on adjacent sheets to prevent bulges from nesting with bulges of adjacent sheets.

3. The method of claim 2 including forming such bulges in the approximate shape of partial cylinders.

4. The method of claim 3 including forming non-circular bulges, each having a reference axis, and orienting the reference axis of a non-circular bulge on one sheet in a different direction from the reference axis of each non-circular bulge on sheets above and below the one sheet.

5. The method of claim 2 including forming said bulges as portions of cylinders to form partial cylindrical bulges each having a long axis and locating the partial-cylindrical bulges adjacent one corner of sheets in the stack of sheets, and orienting the long axes of such partial cylindrical bulges on adjacent sheets at different angles from each other.

6. The method of claim 1 including printing text material on the sheets and forming such bulges adjacent a distal right hand corner of sheets having the bulges, with the sheets oriented for reading printed text on the sheets.

7. The method of claim 6, including forming the partial cylinders of adjacent sheets at different angles from each other relative to a reference edge of the sheets.

8. The method of claim 1 including locating bulges only adjacent a corner of selected sheets in the stack of sheets.

9. The method of claim 8 further comprising forming at least one slit through the at least alternate sheets, and forming the bulges to be raised from a plane of the respective sheets along the slit.

10. The method of claim 1 wherein the edges of the sheets on one side of the sheets in the stack are irregular and the edges on an adjoining side are smooth and including the step of locating bulges primarily adjacent the edges of the adjoining side.

11. The method of claim 1 and forming the radii of curvature of the partial cylindrical bulges sufficiently large so radii of the partial cylinder bulges at least partially re-form, after extended exposure to being forced flat at normal ranges of temperature and humidity when the force is removed.

12. The method of claim 1 wherein forming the bulges comprises forming sheets into a curvature by forcing a sheet on a support mandrel such that when the sheet is removed from such support mandrel the sheet remains curved.

13. The method of claim 1 including the step of applying a thin volatile liquid containing a component rendering it capable of shrinking when dry onto one side of selected sheets in the stack, to provide desired curvature to form the provided bulges when the semi-liquid coating dries.

14. A stack of a plurality of sheets of paper in registry, at least alternate sheets in the stack having bulges formed to separate a next adjacent overlying sheet in the stack from each alternate sheet when less than four sheets overlie each alternate sheet, the bulges and sheets being arranged to prevent bulges of one sheet from nesting in bulges of other sheets.

15. The stack of sheets of claim 14 wherein all of the sheets in the stack have bulges and the bulges are positioned at a different orientation from bulges of both overlying and underlying sheet.

16. The stack of sheets of claim 15 and embossing the bulges in the sheets.

17. The stack of sheets of claim 14, and forming the sheets to have corners and positioning the bulges adjacent a corner of each of the sheets having bulges.

* * * * *